United States Patent
Jiao

(10) Patent No.: US 12,487,471 B1
(45) Date of Patent: Dec. 2, 2025

(54) LENS ANTI-SHAKE ASSEMBLY AND ANTI-SHAKE TELESCOPE

(71) Applicant: Chengdu Dinxin Precision Control Tech Co., Ltd., Chengdu (CN)

(72) Inventor: Zhitao Jiao, Chengdu (CN)

(73) Assignee: Chengdu Dinxin Precision Control Tech Co., Ltd., Chengdu (CN)

( * ) Notice: Subject to any disclaimer, the term of this patent is extended or adjusted under 35 U.S.C. 154(b) by 0 days.

(21) Appl. No.: 19/267,392

(22) Filed: Jul. 11, 2025

(30) Foreign Application Priority Data

Feb. 21, 2025 (CN) .......................... 202520291847.3

(51) Int. Cl.
| | |
|---|---|
| *G02B 27/64* | (2006.01) |
| *G02B 7/00* | (2021.01) |
| *G02B 23/02* | (2006.01) |
| *G02B 23/16* | (2006.01) |

(52) U.S. Cl.
CPC ............ *G02B 27/646* (2013.01); *G02B 7/005* (2013.01); *G02B 23/02* (2013.01); *G02B 23/16* (2013.01)

(58) Field of Classification Search
CPC ...... G02B 27/646; G02B 7/005; G02B 23/02; G02B 23/16; G02B 7/02; G02B 23/00; H04N 23/57; H04N 23/68; H04N 23/682; H04N 23/685; H04N 23/687; G03B 2217/005; G03B 2205/00; G03B 2205/0015

USPC ..... 359/554, 557, 362, 399, 401; 250/201.1, 250/201.2, 201.4; 348/208.99, 208.2, 348/208.12; 396/52, 55
See application file for complete search history.

(56) References Cited

U.S. PATENT DOCUMENTS 6,631,042 B2 * 10/2003 Noguchi ............ H04N 23/6812
359/821

FOREIGN PATENT DOCUMENTS

CN 102116995 A * 7/2011 ............. H04N 23/68

* cited by examiner

*Primary Examiner* — Arnel C Lavarias
(74) *Attorney, Agent, or Firm* — Zhigang Ma

(57) ABSTRACT

A lens anti-shake assembly includes a limiting cover and a lens anti-shake structure. The limiting cover includes a base cover and an end cover. The base cover and the end cover respectively define a first through-hole and a second through-hole corresponding to a position of an anti-shake lens in the lens anti-shake structure. The lens anti-shake structure includes a main control circuit board and a movable component. The main control circuit board is fixedly connected to the base cover and defines a through-hole corresponding to the anti-shake lens. The movable component is connected to the base cover through tension springs to separate the movable component from the main control circuit board, and to make the movable component movable relative to the main control circuit board. An anti-shake telescope includes the above lens anti-shake assembly and has advantages of high anti-shake accuracy, compact size, and high cost-effectiveness.

15 Claims, 2 Drawing Sheets

LENS ANTI-SHAKE ASSEMBLY AND ANTI-SHAKE TELESCOPE

CROSS-REFERENCE TO RELATED APPLICATION

This application claims priority to Chinese Patent Application No. 202520291847.3, filed on Feb. 21, 2025, which is herein incorporated by reference in its entirety.

TECHNICAL FIELD

The disclosure relates the field of image anti-shake technologies, and more particularly to a lens anti-shake assembly and an anti-shake telescope.

BACKGROUND

To address impact of telescope shaking on the field of view, a patent with a Chinese patent application No. 202422082380.X is proposed. This patent provides an anti-shake assembly (also referred to as stabilization assembly) as shown in FIG. 1. Specifically, the anti-shake assembly includes a circuit board and a movable mounting plate connected to each other through tension springs, and a lens is disposed on the movable mounting plate. The anti-shake assembly controls displacement of the movable mounting plate based on information detected by a detection element on the anti-shake assembly, thereby eliminating the impact of the telescope shaking on the field of view. In addition, the anti-shake assembly also limits displacement amplitude of the movable mounting plate through limiting screws, thereby preventing the movable mounting plate from affecting normal use due to excessive movement range.

However, the above patent still has certain drawbacks specifically as follows.

(1) During installation, screwing the limiting screws into the movable mounting plate can easily cause slight deformation of the movable mounting plate, thereby reducing optical performance.

(2) The anti-shake assembly is mounted in a telescope. Due to presence of components on a back of the circuit board and protrusion of screw heads from the back of the circuit board, that is, the back of the circuit board is uneven. This unevenness can cause the anti-shake assembly to be misaligned when assembled within the telescope, thereby increasing anti-shake error.

(3) Since the circuit board is located behind the movable mounting plate, when mounting the anti-shake assembly from a front end of a telescope barrel, an installation tool cannot clamp the circuit board located at a rear of the anti-shake assembly. Instead, it only can clamp the movable mounting plate at a front of the anti-shake assembly. However, the lens is disposed on the movable mounting plate, and it is easy to damage the lens when clamping the movable mounting plate.

In order to solve the above problems, the disclosure provides a lens anti-shake assembly (also referred to as lens stabilization assembly) and an anti-shake telescope (also referred to as stabilization telescope).

SUMMARY

To solve the above technical problems, the disclosure provides a lens anti-shake assembly and an anti-shake telescope with higher reliability.

The disclosure is realized through the following technical solutions. A lens anti-shake assembly, including a limiting cover and a lens anti-shake structure mounted in the limiting cover. The limiting cover includes a base cover and an end cover connected to the base cover. The base cover and the end cover respectively define a first through-hole and a second through-hole corresponding to a position of an anti-shake lens in the lens anti-shake structure.

The lens anti-shake structure includes a main control circuit board and a movable component mounted with the anti-shake lens. The main control circuit board is fixedly connected to the base cover and defines a third through-hole corresponding to the anti-shake lens. The movable component is connected to the base cover through tension springs to separate the movable component from the main control circuit board, and to make the movable component movable relative to the main control circuit board.

The movable component is provided with two drive magnetic steels arranged orthogonally and two sensing magnetic steels arranged orthogonally. The main control circuit board is provided with a gyroscope, two drive coils and two Hall sensors. Positions of the two drive coils correspond one-to-one with the two drive magnetic steels to drive the movable component to move up and down, left and right relative to the main control circuit board. Positions of the two Hall sensors correspond one-to-one with the two sensing magnetic steels.

In an embodiment, multiple support posts are circumferentially arranged on the base cover, the end cover is connected to the base cover through the multiple support posts, and the lens anti-shake structure is mounted in a mounting region jointly enclosed by all of the multiple support posts.

An end face of the base cover is provided with a protrusion.

At least three rolling balls are mounted on the movable component and protrude at least partially from the movable component to separate the movable component from the main control circuit board through the at least three rolling balls.

An anti-shake telescope includes the lens anti-shake assembly as described above.

The anti-shake telescope further includes a telescope housing, an objective lens mounted in the telescope housing, a prism, an eyepiece, a telescope circuit board and a battery. The objective lens, the anti-shake lens of the lens anti-shake assembly, the prism and the eyepiece together define an optical path. The main control circuit board of the lens anti-shake assembly and the battery each are electrically connected to the telescope circuit board.

The telescope circuit board is provided with a charging connector and a switch.

The anti-shake telescope is a Porro-prism telescope or a roof-prism telescope.

The battery is a replaceable cylindrical battery.

Compared to the related art, the disclosure may achieve the following beneficial effects.

(1) In the lens anti-shake assembly of the disclosure, the lens anti-shake structure is disposed in the limiting cover, and the movable assembly is restrained and protected through the support posts of the limiting cover. Compared to a conventional method of using limiting screws, this design prevents deformation of the movable assembly, thereby ensuring optical performance.

(2) In the lens anti-shake assembly of the disclosure, the end face of the base cover is provided with a protrusion. When the lens anti-shake assembly is mounted in the telescope, the protrusion is configured to engage with a retaining groove in the telescope housing, thereby securing the lens anti-shake assembly, preventing misalignment of the lens anti-shake assembly, and ensuring anti-shake accuracy (also referred to as stabilization accuracy).

(3) In the lens anti-shake assembly of the disclosure, the lens anti-shake structure is protected by the limiting cover, preventing damage to the anti-shake lens when mounting lens anti-shake assembly.

BRIEF DESCRIPTION OF DRAWINGS

Attached drawings referred to herein are intended to provide a further understanding of the disclosure and form a part of the disclosure. Illustrative embodiments of the disclosure and their description are intended to explain the disclosure and not to limit the disclosure. In the attached drawings, same reference signs refer to same elements.

DESCRIPTION OF REFERENCE SIGNS

Figure 1:
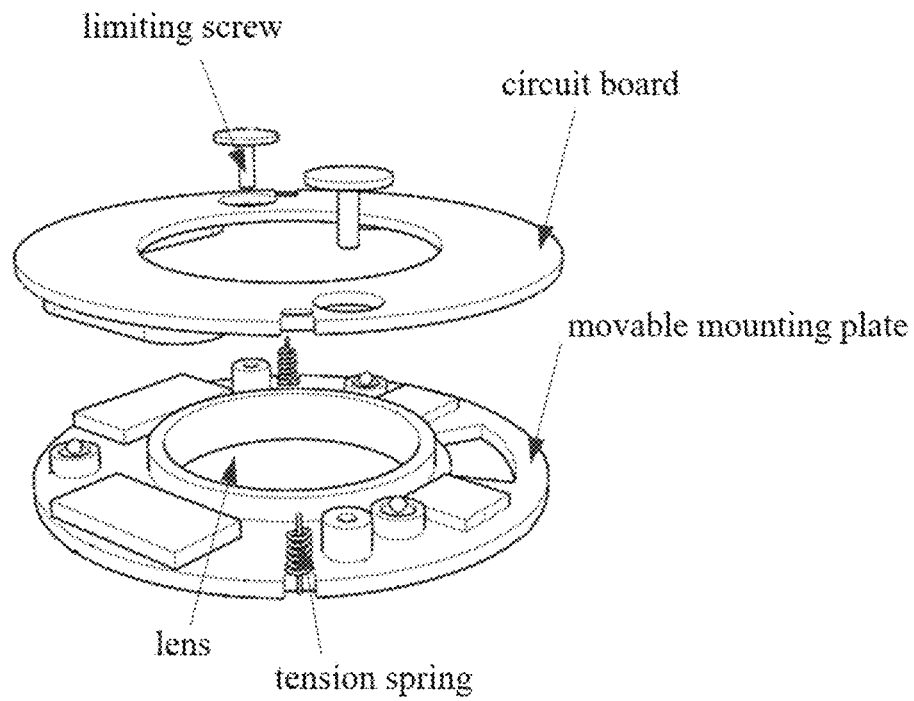
FIG. 1 illustrates a schematic structural diagram of an anti-shake assembly of the related art.

10—end cover; 101—second through-hole; 20—base cover; 201—first through-hole; 21—support post; 22—protrusion; 30—tension spring: 40—lens anti-shake structure; 41—movable component; 42—drive magnetic steel; 43—rolling ball; 44—Hall sensor; 45 main control circuit board; 451—third through-hole; 452—tension spring avoidance groove; 46—sensing magnetic steel; 47—anti-shake lens; 48—gyroscope; 49—drive coil; 50—lens anti-shake assembly; 60—telescope housing; 70—objective lens; 80—charging connector; 90—telescope circuit board; 100—switch; 110—prism; 120—eyepiece; 130—battery.

DETAILED DESCRIPTION OF EMBODIMENTS

In order to enable a better understanding of technical solutions of the disclosure for those skilled in the art, the technical solutions of the disclosure will be described clearly and completely in conjunction with attached drawings in embodiments of the disclosure. It is apparent that described embodiments are merely a part of the embodiments of the disclosure, not all of them. Based on the embodiments of the disclosure, all other embodiments obtained by those skilled in the art without making any inventive effort shall fall within the scope of protection of the disclosure.

It should be noted that, if terms such as "first", "second", etc., are involved in description, claims, and the above-mentioned attached drawings of the disclosure, they are used to distinguish similar objects and are not intended to describe a specific order or sequence. It should be understood that data used in this manner can be interchanged in appropriate cases for the embodiments of the disclosure described herein. In addition, if terms such as "include" "have" and any of their variations are involved, the intention is to cover non-exclusive inclusion. For example, a process, a method, a system, a product, or a device that includes a series of steps or units is not limited to the steps or the units clearly listed, but may include other steps or units not clearly listed or inherent to such process, method, product, or device.

In the disclosure, if terms such as "upper", "lower", "left", "right", "front", "rear", "top", "bottom", "inner", "outer", "middle", "vertical", "horizontal", "transverse", "longitudinal", etc., are involved, indicated orientation or positional relationship is based on orientation or positional relationship shown in the attached drawings. These terms are primarily used to better describe the disclosure and the embodiments thereof, and are not intended to limit indicated devices, components, or parts to having a specific orientation, or to being constructed and operated in a specific orientation.

Furthermore, in addition to indicating the orientation or the positional relationship, some of the above terms may also be used to denote other meanings. For example, the term "upper" may, in certain contexts, be used to indicate a relationship of attachment or connection. For those skilled in the art, specific meanings of these terms in the context of the disclosure can be understood based on specific circumstances.

In addition, in the disclosure, if terms such as "install," "set" "be provided with" "connect" "link" "coupling", etc., are involved, they should be understood in a broad sense. For example, they may refer to fixed connections, detachable connections, or integral constructions; mechanical connections or electrical connections; direct connections or indirect connections through an intermediate medium, or even internal communications between two devices, components, or parts. For those skilled in the art, specific meanings of the above terms in the context of the disclosure can be understood based on specific circumstances.

It should be noted that, in the absence of conflict, the embodiments and features within the embodiments of the disclosure may be combined with each other. The following detailed description of the disclosure will be provided with reference to the attached drawings and in conjunction with the embodiments.

First Embodiment

Figure 2:
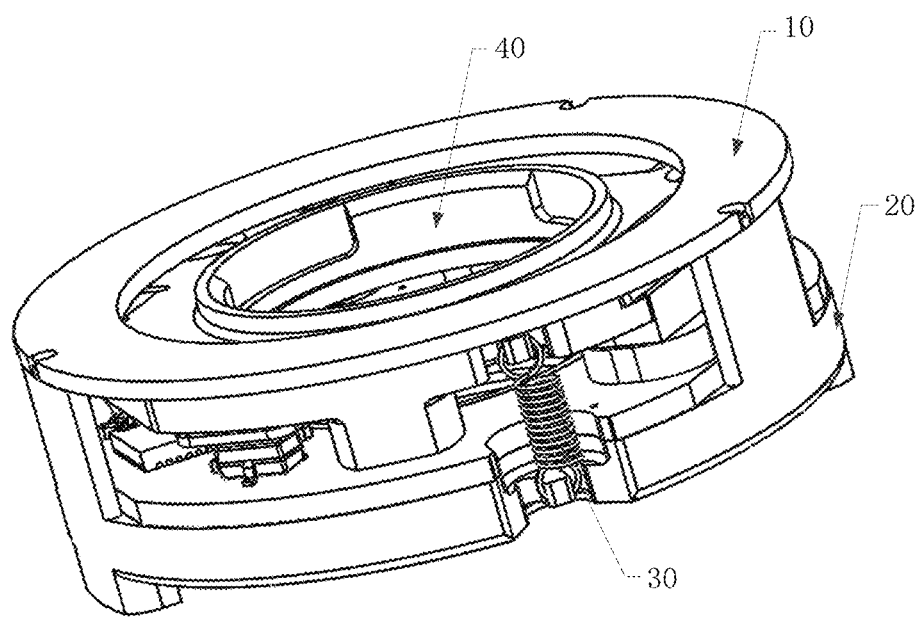
FIG. 2 illustrates a schematic structural diagram of a lens anti-shake assembly of the disclosure.
Figure 3:
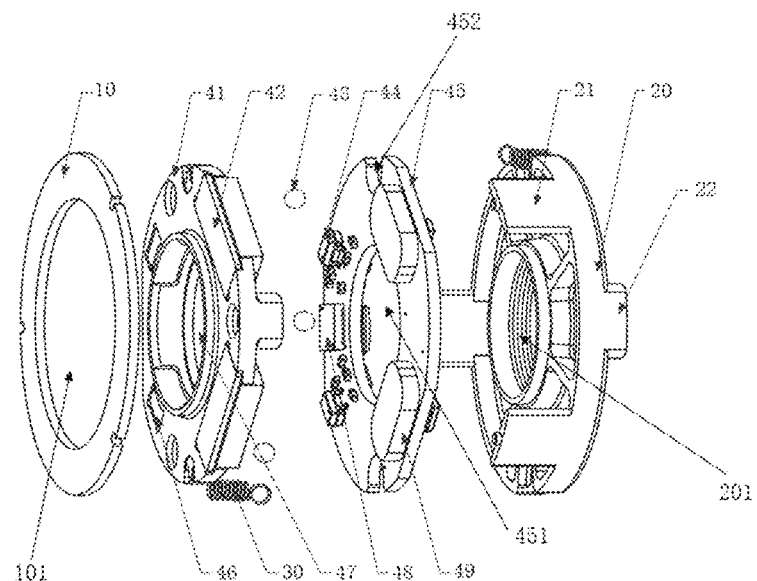
FIG. 3 illustrates an exploded view of the lens anti-shake assembly of the disclosure.

As shown in FIG. 2 and FIG. 3, the embodiment provides a lens anti-shake assembly, including a limiting cover and a lens anti-shake structure 40 mounted in the limiting cover.

The limiting cover includes a base cover 20 and an end cover 10 connected to the base cover 20. The base cover 20 and the end cover 10 respectively define a first through-hole 201 and a second through-hole 101 corresponding to a position of an anti-shake lens 47 in the lens anti-shake structure 40. Therefore, the base cover 20 and the end cover 10 cannot obstruct the anti-shake lens 47 of the lens anti-shake structure 40.

Specifically, multiple support posts 21 are circumferentially arranged on the base cover 20. The end cover 10 is mounted on the support posts 21 through screws, thereby enabling the end cover 10 to be connected to the base cover 20 through the support posts 21. The lens snit-shake structure 40 is mounted in a mounting rejoin jointly enclosed by all of the support posts 21, as shown in FIG. 2. Therefore, the entire lens anti-shake structure 40 is protected in the limiting cover.

In addition, an end face of the base cover 20 is provided with a protrusion 22. The protrusion 22 is configured to engage with a retaining groove in a telescope housing, thereby securely mounting the lens anti-shake structure 40 in a telescope and ensuring anti-shake accuracy.

As shown in FIG. 3, the lens anti-shake structure 40 includes a main control circuit board 45 and a movable component 41. Specifically, the anti-shake lens 47 is mounted on the movable component 41. The main control circuit board 45 defines a third through-hole 451 corresponding to the anti-shake lens 47. During assembly, the main control circuit board 45 is fixedly mounted in the base cover 20, and the movable component 41 is connected to the base cover 30 through multiple tension springs 30. Specifically, the main control circuit board 45 may defines multiple tension spring avoidance grooves 452, an end of each of the tension springs 30 is connected to the base cover 20, and another end of each of the tension springs 30 passes through a corresponding tension spring avoidance groove 452 and is connected to the movable component 41. Supported by the tension springs 30, the movable component 41 is separated from the main control circuit board. Due to flexibility of the tension springs 30, the movable assembly 41 can move relative to the main control circuit board 45 when subjected to an external force.

The movable component 41 is carried by a movable mounting plate and is provided with two drive magnetic steels 42 arranged orthogonally and two sensing magnetic steels 46 arranged orthogonally. The main control circuit board 45 is provided with a gyroscope 48, two drive coils and two Hall sensors. Positions of the two drive coils 49 correspond one-to-one with the two drive magnetic steels 42 to drive the movable component 41 to move up and down, left and right relative to the main control circuit board 45. Positions of the two Hall sensors 44 correspond one-to-one with the two sensing magnetic steels 46.

Through the above structure, one drive coil 49, together with its corresponding drive magnetic steel 42, forms a drive mechanism in one direction, such as a left-right direction, enabling the movable assembly 41 to move in the left-right direction. The other drive coil 49, together with its corresponding drive magnetic steel 42, forms a drive mechanism in another direction, such as an up-down direction, enabling the movable assembly 41 to move in the up-down direction. The two Hall sensors 44 are respectively used to detect movement information of the two sensing magnetic steels 46. When the movable assembly 41 moves, the two sensing magnetic steels 46 also move accordingly. The two Hall sensors 44 respectively detect movement information of the movable assembly 41 in the left-right direction and the up-down direction, thereby obtaining movement information of the anti-shake lens 47.

The main control circuit board 45 can acquire detection information from the Hall sensors 44 and the gyroscope 48, and controls operation of the two drive coils 49 based on the acquired information, thereby controlling the movement of the movable assembly 41.

In addition, at least three rolling balls 43 are mounted on the movable component 43, and protrude at least partially from the movable component 43 to separate the movable component 41 from the main control circuit board 45 through the at least three rolling balls 43. Rolling characteristics of the rolling balls 43 enable the movable assembly 41 to move more smoothly.

In lens anti-shake assembly of the embodiment, the lens anti-shake structure 40 is disposed in the limiting cover, and the movable assembly 41 is restrained and protected by the support posts 21 of the limiting cover. Compared to a conventional method of using limiting screws, this design prevents deformation of the movable assembly 41, thereby ensuring optical performance.

Second Embodiment

Figure 4:
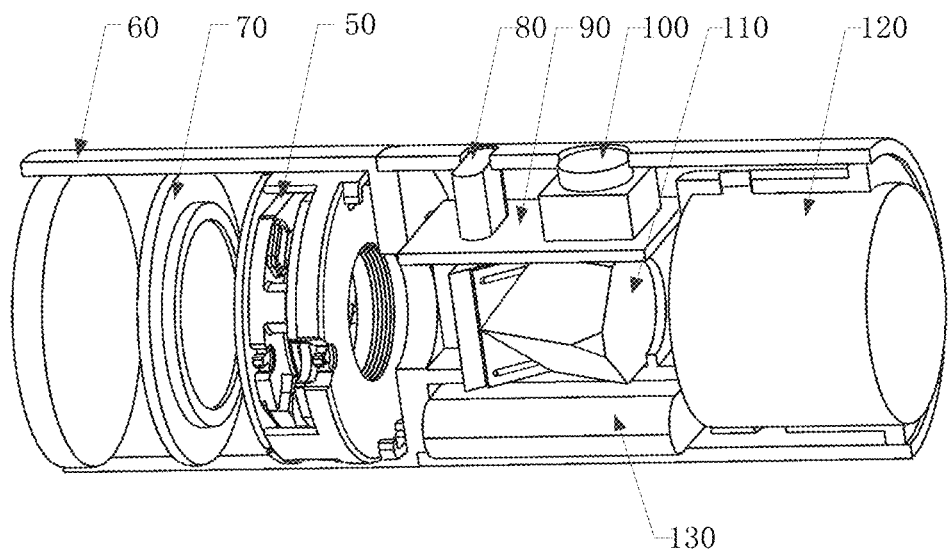
FIG. 4 illustrates a cross-sectional view of an anti-shake telescope of the disclosure.

As shown in FIG. 4, the embodiment provides an anti-shake telescope, including a telescope housing 60, an objective lens 70 mounted in the telescope housing 60, the lens anti-shake assembly 50 of the first embodiment, a prism 110, an eyepiece 120, a telescope circuit board 90 and a battery 130. Specifically, the objective lens 70, the anti-shake lens 47 of the lens anti-shake assembly 50, the prism 110 and the eyepiece 120 are sequentially arranged in that order from a front end to a rear end of the telescope, thereby the objective lens 70, the anti-shake lens 47 of the lens anti-shake assembly 50, the prism 110 and the eyepiece 120 together define an optical path. The main control circuit board 45 of the lens anti-shake assembly 50 and the battery each are electrically connected to the telescope circuit board 90.

Specifically, the battery 130 may be a rechargeable battery, and the telescope circuit board 90 is provided with a charging connector 80. The charging connector 80 is configured to extend to an outside of the telescope housing 60 to facilitate charging of the battery 130. Alternatively, the battery 130 can also use a replaceable cylindrical battery, in which case the charging connector 80 may be omitted. In addition, the telescope circuit board 90 is also provided with a switch 100, and the switch 100 is also configured to extend to the outside of the telescope housing 60 to enable control of the entire device (i.e., the anti-shake telescope).

The telescope housing 60 defines a retaining groove therein. During assembly, the protrusion 22 of the lens anti-shake assembly 50 is configured to engage with the retaining groove, thereby securing the lens anti-shake assembly 50 in the telescope housing 60, preventing misalignment of the lens anti-shake assembly 50, and ensuring anti-shake accuracy of the anti-shake telescope.

Because the lens anti-shake structure 40 is protected in the limiting cover, when the lens anti-shake assembly 50 is mounted from the front end of the telescope housing 60, an installation tool can clamp the limiting cover rather than directly contacting the movable assembly 41, thereby preventing damage to the anti-shake lens 47 mounted on the movable assembly 41.

During operation of the anti-shake telescope, when vibration occurs, the gyroscope 48 detects vibration information, and the main control circuit board 45 calculates a target displacement required for the anti-shake lens 47 based on the vibration information. Simultaneously, the Hall sensors detect translational data of the movable assembly 41, i.e., movement data of the anti-shake lens 47. The main control circuit board 45 uses the movement data of the anti-shake lens 47 as a feedback quantity in a feedback control algorithm to obtain drive amounts of the two drive magnetic steels 42. The two drive coils 49 then drive corresponding drive magnetic steels 42 to translate, thereby moving the anti-shake lens 47 to counteract vibration-induced field-of-view jitter and achieve image stabilization. In practice, the anti-shake telescope may be a Porro-prism telescope or a roof-prism telescope.

It should be noted that all features disclosed in this specification, or all steps in disclosed methods or processes, except for those features and/or steps that are mutually exclusive, may be combined in any manner.

In addition, the specific embodiments described above are illustrative. Those skilled in the art may conceive various solutions inspired by the content disclosed in the disclosure, and these solutions are also within the scope of the disclosure and fall within the scope of protection of the disclosure. Those skilled in the art should understand that the specification and the attached drawings of the disclosure are for illustrative purposes and do not limit the claims. The scope of protection of the disclosure is defined by the claims and their equivalents.

What is claimed is:

1. A lens anti-shake assembly, comprising a limiting cover and a lens anti-shake structure (40) mounted in the limiting cover, wherein the limiting cover comprises a base cover (20) and an end cover (10) connected to the base cover (20), the base cover (20) and the end cover (10) respectively define a first through-hole (201) and a second through-hole (101) corresponding to a position of an anti-shake lens (47) in the lens anti-shake structure (40);

wherein the lens anti-shake structure (40) comprises a main control circuit board (45) and a movable component (41) mounted with the anti-shake lens (47); the main control circuit board (45) is fixedly connected to the base cover (20) and defines a third through-hole (451) corresponding to the anti-shake lens (47); and the movable component (41) is connected to the base cover (20) through tension springs (30) to separate the movable component (41) from the main control circuit board (45), and to make the movable component (41) movable relative to the main control circuit board (45); and wherein the movable component (41) is provided with two drive magnetic steels (42) arranged orthogonally and two sensing magnetic steels (46) arranged orthogonally; the main control circuit board (45) is provided with a gyroscope (48), two drive coils (49) and two Hall sensors (44), positions of the two drive coils (49) correspond one-to-one with the two drive magnetic steels (42) to drive the movable component (41) to move up and down, left and right relative to the main control circuit board (45), and positions of the two Hall sensors (44) correspond one-to-one with the two sensing magnetic steels (46).

2. The lens anti-shake assembly as claimed in claim 1, wherein a plurality of support posts (21) are circumferentially arranged on the base cover (20), the end cover (10) is connected to the base cover (20) through the plurality of support posts (21), and the lens anti-shake structure (40) is mounted in a mounting region jointly enclosed by all of the plurality of support posts (21).

3. The lens anti-shake assembly as claimed in claim 1, wherein an end face of the base cover (20) is provided with a protrusion (22).

4. The lens anti-shake assembly as claimed in claim 1, wherein at least three rolling balls (43) are mounted on the movable component (43) and protrude at least partially from the movable component (43) to separate the movable component (41) from the main control circuit board (45) through the at least three rolling balls (43).

5. An anti-shake telescope, comprising the lens anti-shake assembly (50) as claimed in claim 1.

6. The anti-shake telescope as claimed in claim 5, further comprising a telescope housing (60), an objective lens (70) mounted in the telescope housing (60), a prism (110), an eyepiece (120), a telescope circuit board (90) and a battery (130), wherein the objective lens (70), the anti-shake lens (47) of the lens anti-shake assembly (50), the prism (110) and the eyepiece (120) together define an optical path, and the main control circuit board (45) of the lens anti-shake assembly (50) and the battery each are electrically connected to the telescope circuit board (90).

7. The anti-shake telescope as claimed in claim 6, wherein the telescope circuit board (90) is provided with a charging connector (80) and a switch (100).

8. The anti-shake telescope as claimed in claim 5, wherein the anti-shake telescope is a Porro-prism telescope or a roof-prism telescope.

9. The anti-shake telescope as claimed in claim 6, wherein the battery (130) is a replaceable cylindrical battery.

10. A lens anti-shake assembly, comprising:
a limiting cover, comprising a base cover (20) and an end cover (10) connected to the base cover (20), wherein the base cover (20) and the end cover (10) respectively define a first through-hole (201) and a second through-hole (101), and a position of each of the first through-hole (201) and a second through-hole (101) corresponds to a position of an anti-shake lens (47); and
a lens anti-shake structure (40), mounted in the limiting cover, wherein the lens anti-shake structure (40) comprises:
a main control circuit board (45), fixedly connected to the base cover (20), wherein the main control circuit board (45) defines a third through-hole (451) corresponding to the position of the anti-shake lens (47); and
a movable component (41), mounted with the anti-shake lens (47), wherein the movable component (41) is connected to the base cover (20) through tension springs (30) to separate the movable component (41) from the main control circuit board (45), and to make the movable component (41) movable relative to the main control circuit board (45);
wherein the movable component (41) is provided with two drive magnetic steels (42) arranged orthogonally and two sensing magnetic steels (46) arranged orthogonally; and
wherein the main control circuit board (45) is provided with a gyroscope (48), two drive coils (49) and two Hall sensors (44), positions of the two drive coils (49) correspond one-to-one with the two drive magnetic steels (42) to drive the movable component (41) to move, and positions of the two Hall sensors (44) correspond one-to-one with the two sensing magnetic steels (46) to detect movement of the movable component (41).

11. The lens anti-shake assembly as claimed in claim 10, wherein the main control circuit board (45) defines a plurality of tension spring avoidance grooves (452), an end of each of the tension springs (30) is connected to the base cover (20), and another end of each of the tension springs (30) passes through a corresponding one of the plurality of tension spring avoidance grooves (452) and is connected to the movable component (41).

12. The lens anti-shake assembly as claimed in claim 10, wherein the two drive coils (49) and two Hall sensors (44) are disposed on a side of the main control circuit board (45) facing towards the movable component (41).

13. The lens anti-shake assembly as claimed in claim 11, wherein a plurality of support posts (21) are circumferentially arranged on the base cover (20), the end cover (10) is connected to the base cover (20) through the plurality of support posts (21), and the lens anti-shake structure (40) is mounted in a mounting region jointly enclosed by all of the plurality of support posts (21).

14. The lens anti-shake assembly as claimed in claim 13, wherein an end face of the base cover (20) is provided with a protrusion (22).

15. The lens anti-shake assembly as claimed in claim 14, wherein at least three rolling balls (43) are mounted on the movable component (43) and protrude at least partially from the movable component (43) to separate the movable component (41) from the main control circuit board (45) through the at least three rolling balls (43).

\* \* \* \* \*